United States Patent [19]
Robins

[11] Patent Number: 5,337,515
[45] Date of Patent: Aug. 16, 1994

[54] HYDROPONIC GARDENING METHOD AND APPARATUS

[76] Inventor: Kevin J. Robins, P.O. Box 7577, Arlington, Va. 22207

[21] Appl. No.: 787,818

[22] Filed: Nov. 5, 1991

[51] Int. Cl.$^5$ .......................................... A01G 31/00
[52] U.S. Cl. .......................................... 47/62; 47/59
[58] Field of Search .......................................... 47/59, 62

[56] References Cited

U.S. PATENT DOCUMENTS

| | | |
|---|---|---|
| 2,062,755 | 12/1936 | Lyons et al. . |
| 2,188,875 | 1/1940 | Ellis . |
| 2,241,699 | 5/1941 | Cooper . |
| 2,747,331 | 5/1956 | Steiner . |
| 2,940,218 | 6/1960 | Carter . |
| 2,983,076 | 5/1961 | Merrill . |
| 3,131,064 | 4/1964 | Malchair . |
| 3,250,606 | 5/1966 | Murray . |
| 3,300,895 | 1/1967 | Dosedla et al. . |
| 3,305,968 | 2/1967 | Dosedla et al. . |
| 3,352,057 | 11/1967 | Ferrand . |
| 3,660,933 | 5/1970 | Wong, Jr. . |
| 3,766,684 | 10/1973 | Kato . |
| 3,889,415 | 6/1975 | Holmes . |
| 3,892,982 | 7/1975 | Holmes . |
| 3,925,926 | 12/1975 | Shigeo . |
| 4,004,369 | 1/1977 | Kato et al. . |
| 4,033,072 | 7/1977 | Kobayashi et al. . |
| 4,057,930 | 11/1977 | Barham . |
| 4,057,933 | 11/1977 | Enyeart . |
| 4,107,875 | 8/1978 | Bordine . |
| 4,170,844 | 10/1979 | Steele . |
| 4,177,604 | 12/1979 | Friesen . |
| 4,211,034 | 7/1980 | Piesner ................................. 47/59 |
| 4,245,434 | 1/1981 | Green . |
| 4,302,906 | 12/1981 | Kawabe et al. . |
| 4,324,069 | 4/1982 | Flagg . |
| 4,332,105 | 6/1982 | Nir . |
| 4,334,386 | 6/1982 | Burcombe et al. . |
| 4,371,995 | 2/1983 | Donhauser ............................ 47/59 |
| 4,447,983 | 5/1984 | Shinada ................................. 47/62 |
| 4,527,353 | 7/1985 | Newby ................................... 47/59 |
| 4,603,506 | 8/1986 | Powell, Jr. . |
| 4,813,176 | 3/1989 | Takayasu .............................. 47/59 |
| 4,951,416 | 8/1990 | Gutridge ............................... 47/62 |

FOREIGN PATENT DOCUMENTS

| | | |
|---|---|---|
| 2901713 | 7/1979 | Fed. Rep. of Germany .......... 47/59 |
| 2813410 | 10/1979 | Fed. Rep. of Germany .......... 47/59 |
| 2101863 | 1/1983 | United Kingdom .................... 47/59 |

*Primary Examiner*—Ramon S. Britts
*Assistant Examiner*—Joanne C. Downs

[57] ABSTRACT

An apparatus for hydroponic cultivation including a pneumatic pump, a pumping tank, an overflow tank, a pneumatic valve, solution distribution tubing, and a plant growing container. The configuration presented achieves the results required from such a system in that is inexpensive to develop and works effectively with low maintenance. The system has the added feature of applying air directly to the roots of the plants at selected intervals. A method is also disclosed.

5 Claims, 14 Drawing Sheets

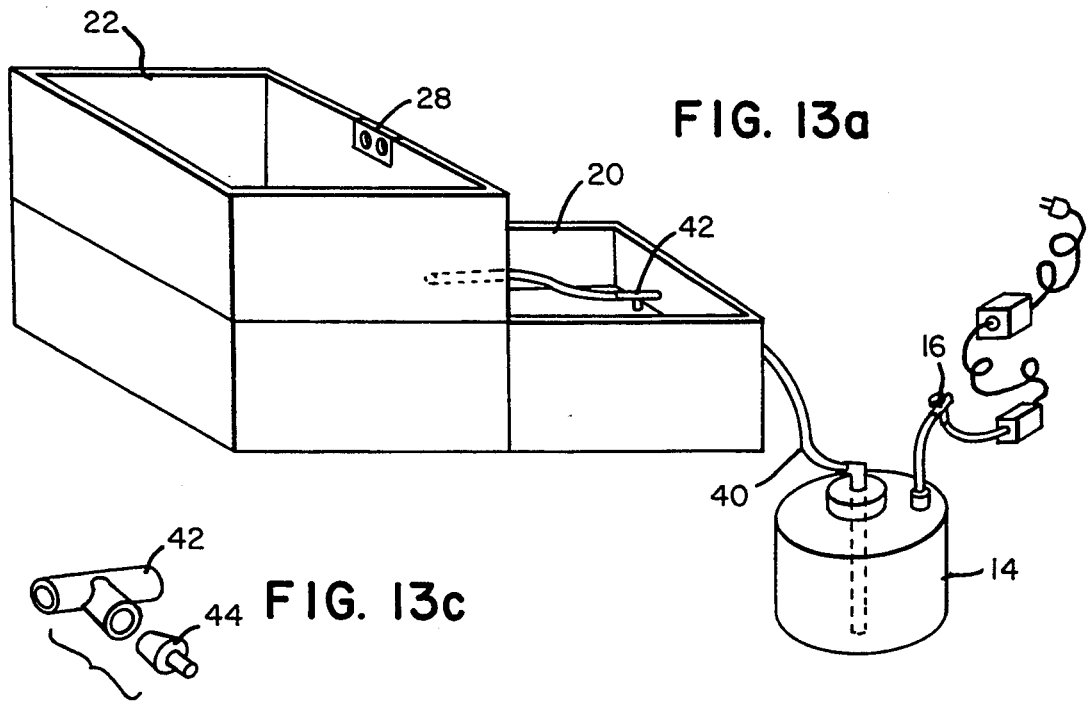
FIG. 13a
FIG. 13c
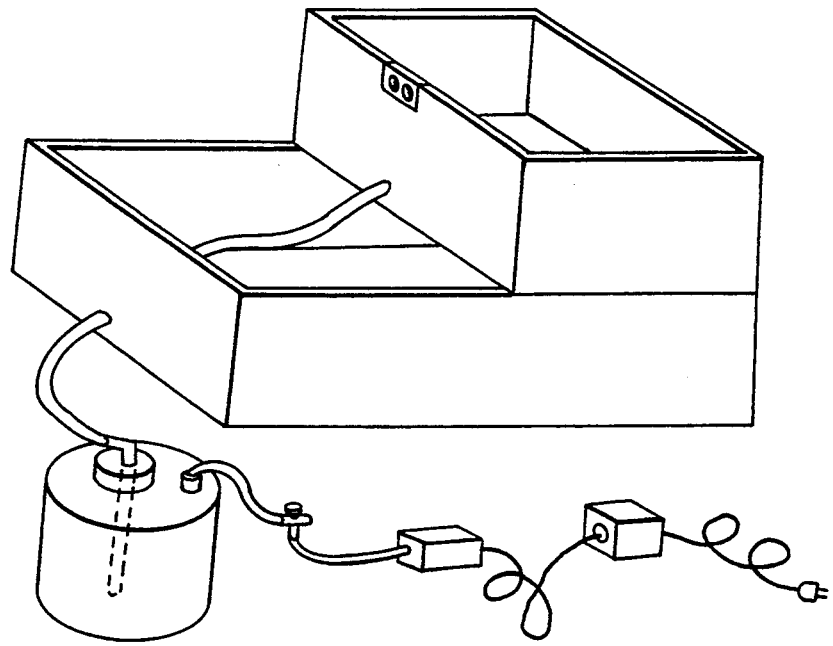
FIG. 13b

HYDROPONIC GARDENING METHOD AND APPARATUS

BACKGROUND OF THE INVENTION

1. Field of the Invention

This invention relates to the art of hydroponic cultivation. In particular, it relates to a hydroponic gardening apparatus of inexpensive and simple construction which advantageously recirculates nutrient solution and aerates the growing medium, among other advantages. The invention also relates to a simple and easily implemented method of hydroponic gardening.

2. Background Art

Long past the days when it was a simple curiosity to grow plants without soil, hydroponic gardening has now become a major commercial industry. Mirroring its success on the commercial scale, hydroponic cultivation has become more important to the home gardener as well, not simply because the idea of growing plants without soil is intrinsically intriguing, but also because of the relative ease with which plants can be grown using hydroponic techniques.

Many systems are available to the home gardener interested in practicing hydroponics. While most in general function satisfactorily, they are still relatively expensive. There thus exists a need for a simple and relatively inexpensive home hydroponic gardening apparatus.

SUMMARY OF THE INVENTION

This goal is achieved in the present invention through provision of a hydroponic gardening method and apparatus using air displacement to pump fluid to a growing tray which the fluid is permitted to overflow. Air displacement makes it possible to have a system with a minimum of moving parts. This reduces the overall maintenance and cost associated with more complex systems. Further, this device has the capability of being able to pump air directly into the plant growing tray at the end of the feeding cycle. Oxygenation of this sort has been proven to increase plant growth and reduce the chance of infection. Overflow ensures a constant level of aqueous solution can be provided to the root system of the plant growing tray when there is a variation in the level of the solution due to evaporation and absorption overtime.

More particularly, these goals are met through implementing a method of hydroponic cultivation using a plant container and an overflow tank both connected by conduits to a pumping tank. Nutrient solution is pumped from the pumping tank into the bottom of the plant container by forcing a gas into the pumping tank until the nutrient solution overflows the plant container and the pumping tank is substantially empty of nutrient solution. The overflowing nutrient solution is caught in the overflow tank. Once substantially all of the fluid has been pumped from the pumping tank, gas is permitted to escape the pumping tank to allow the nutrient solution to return to the pumping tank through the conduits.

The invention is embodied in a hydroponic cultivation apparatus comprising a pumping tank and a plant container connected together by a conduit. The conduit enters the plant container near the bottom of the plant container. An overflow tank is connected to the pumping tank by another conduit and arranged in relation to the plant container to catch overflow from the plant container. The pumping tank is also connected to means for pressurizing the pumping tank to force liquid from the pumping tank into the plant container through the first conduit until the plant container overflows and the pumping tank is substantially empty of liquid. The pumping tank is additionally connected to means for thereafter depressurizing the pumping tank to allow fluid in the plant container and the overflow tank to return to the pumping tank.

Numerous other objectives and advantages of the present invention will be apparent from a consideration of the following detailed description.

BRIEF DESCRIPTION OF THE DRAWINGS

FIGS. 13(a) and 13(b) are perspective views of an eighth embodiment of the hydroponic gardening system according to the present invention; FIG. 13(c) is an enlarged view of a component shown in FIGS. 13(a) and 13(b).

DETAILED DESCRIPTION OF THE PREFERRED EMBODIMENTS

Figure 1:
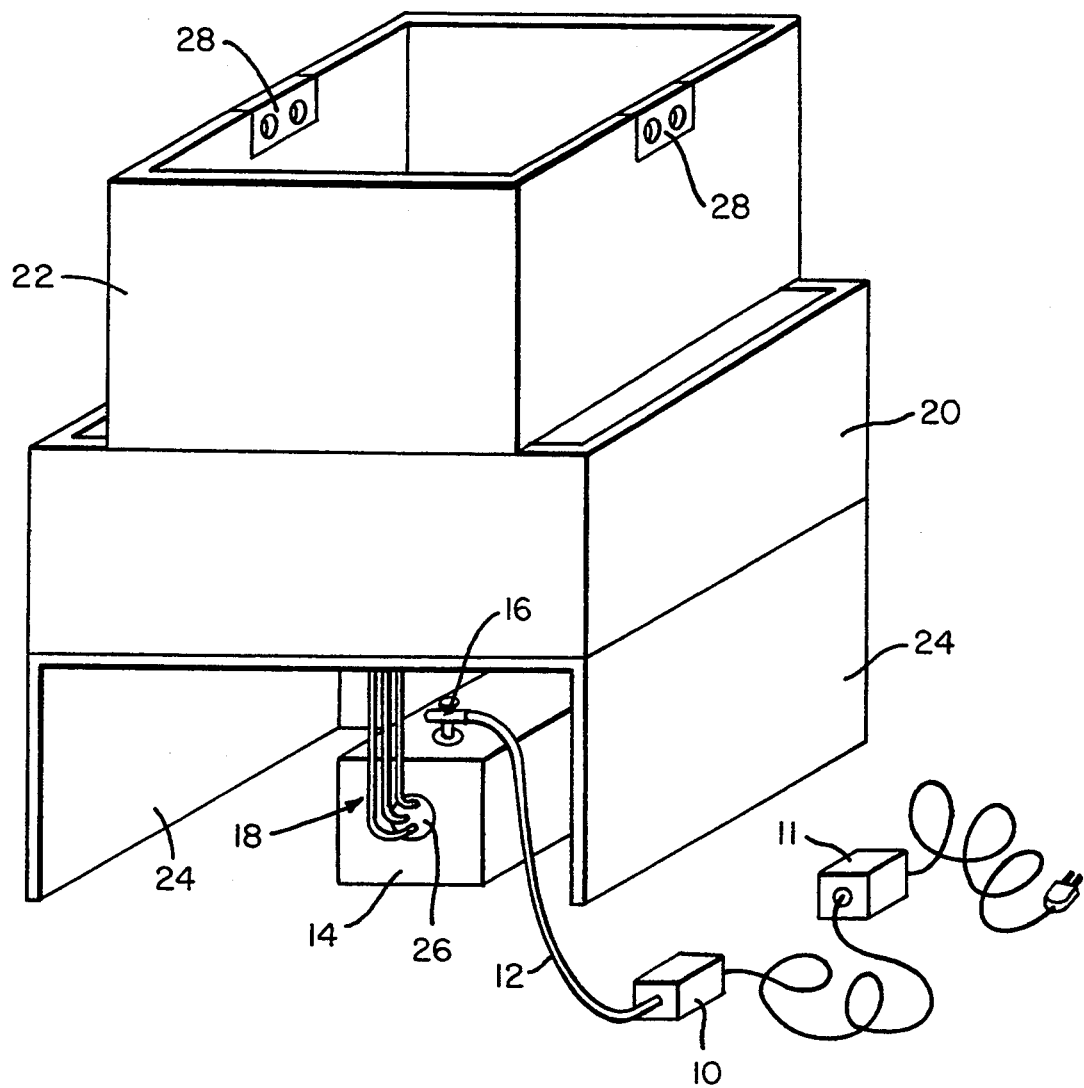
FIG. 1 is a perspective view of a hydroponic gardening system according to a first preferred embodiment of the present invention.

In the figures, the same number has been used to refer to corresponding elements in the embodiments. Referring to FIG. 1, the hydroponic growing system depicted therein includes a pneumatic pump 10, tubing 12 to deliver pneumatic pressure from the pump 10 to a pumping tank 14, and a passive pneumatic valve 16. The pump 10 is a simple and inexpensive pump, such as pumps which are commonly available at pet supply stores for aquariums.

An aqueous solution is displaced from the pumping tank 14 under pneumatic pressure through solution distribution tubing 18. The solution is displaced simultaneously into an overflow tank 20 and plant growing container 22. The overflow tank 20 is positioned atop a support stand 24. The plant growing container 22 may be positioned alongside, inside, or atop the overflow tank 20. In the embodiment shown, the growing plant container is positioned atop the overflow tank 20.

Figure 2:
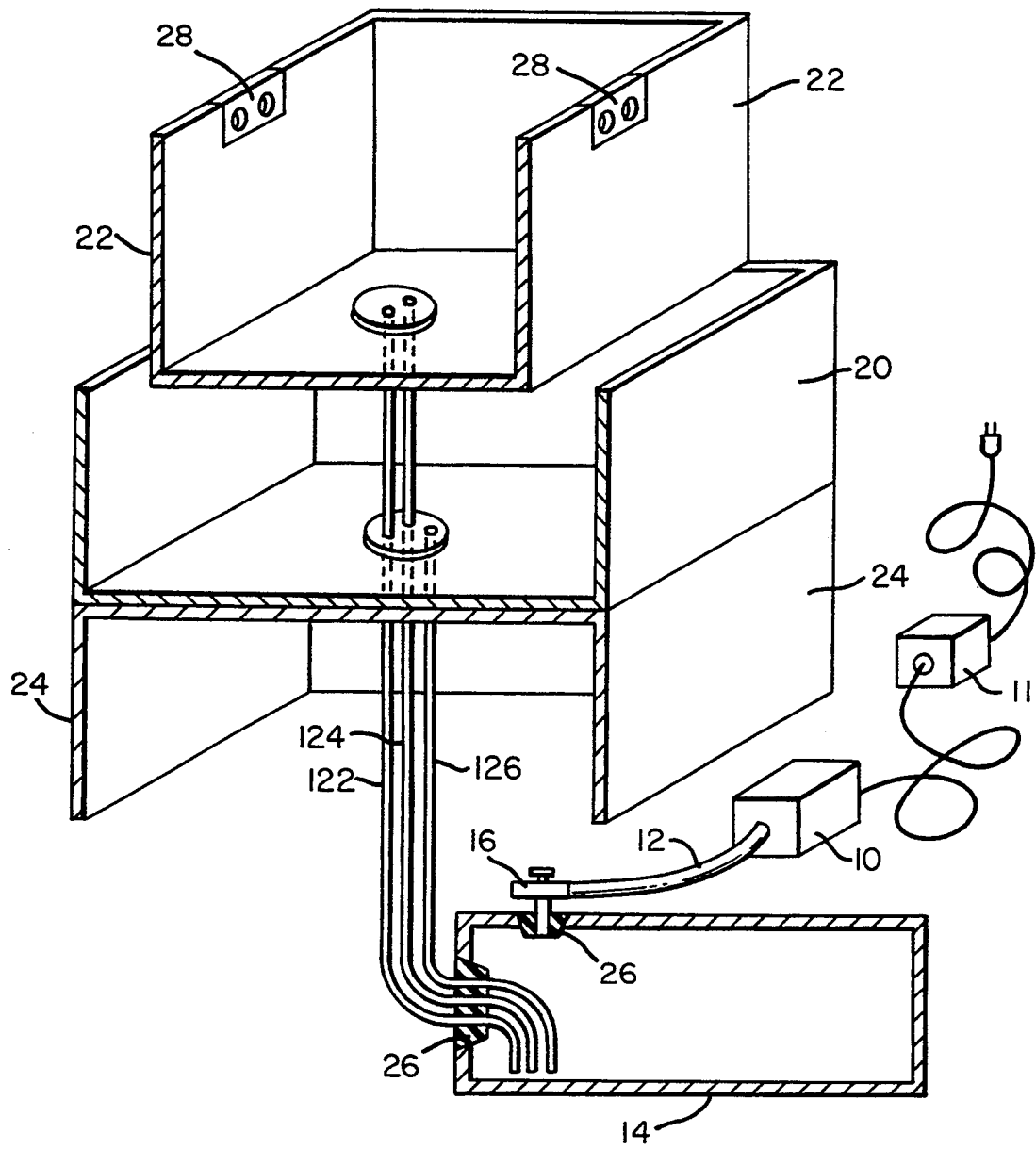
FIG. 2 is a partially cut away view of the embodiment of FIG. 1.

Referring to FIG. 2, in operation, the three-way passive pneumatic valve 16 is set to allow sufficient pressure to enter the pumping tank 14 to displace the aqueous solution when the pneumatic pump 10 is on. At the same time, the pneumatic valve 16 is set to "bleed" air to allow the solution to flow back into the pumping tank 14 once the pump 10 is turned off. Sufficient pneumatic pressure is provided by the pump 10, when it is on, to displace substantially all of the solution in the pumping tank 14 despite the loss of pressure through the valve 16.

In operation, the pumping tank 14 is filled with the aqueous solution. The passive valve 16 is set for proper operation as described above. The pump 10 is then turned on either manually or by some form of an automatic device such as a timed switch 11, shown schematically. The pneumatic pressure then displaces the aqueous solution through the solution distribution tubing 18.

Figure 3:
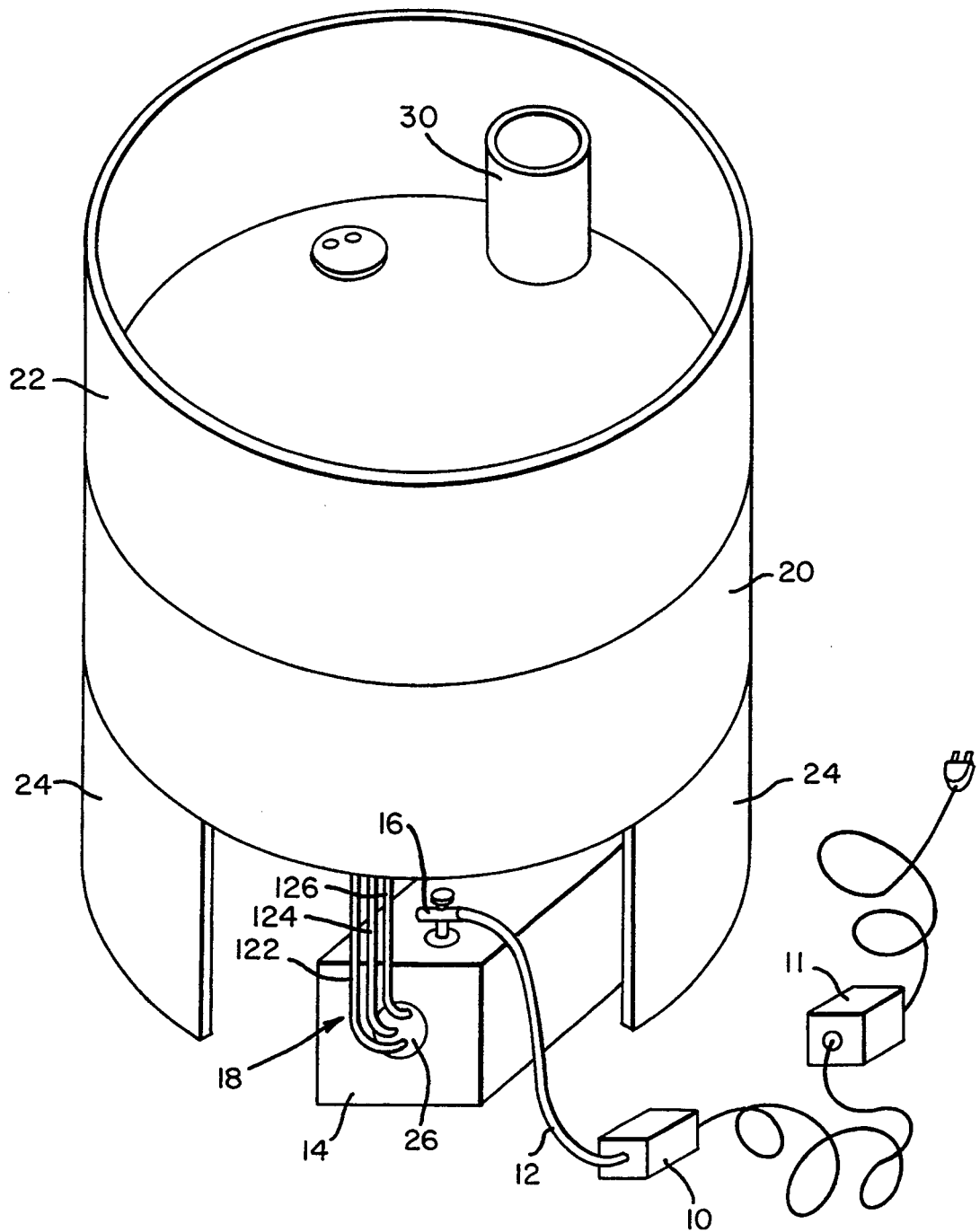
FIG. 3 is a perspective view of a second embodiment of hydroponic gardening system according to the present invention.
Figure 4:
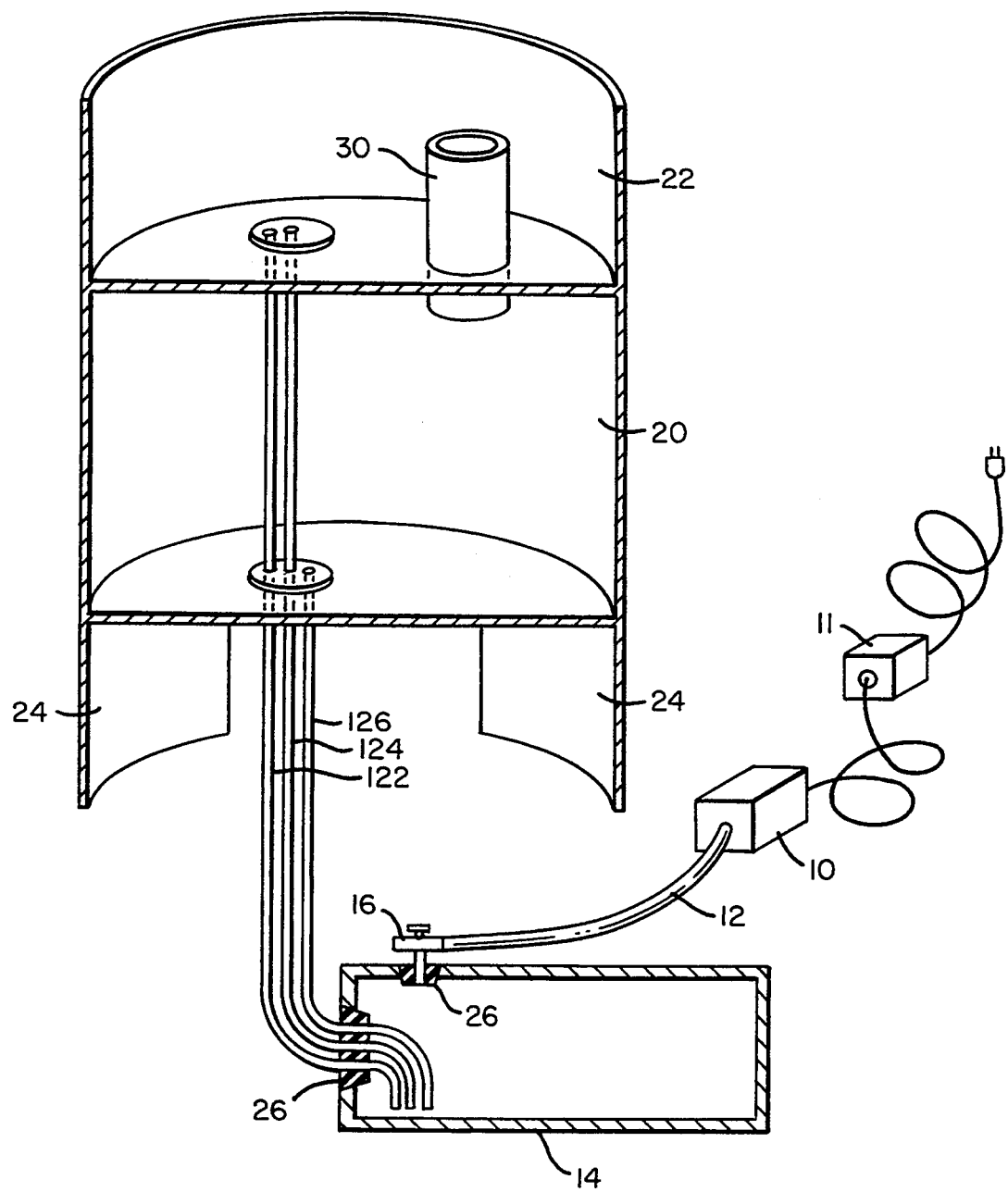
FIG. 4 is a partially cut away view of the embodiment of FIG. 3.

Referring to FIGS. 3 and 4, a second embodiment of the invention has three solution distribution tubes 122, 124, and 126 connected to the pumping tank 14. These tubes are mounted using a rubber stopper 26 to allow for an airtight seal which can be pressurized. The three-way pneumatic valve 16 is similarly mounted using a rubber stopper 26.

The aqueous solution is displaced in approximately equal volumes through each of the solution distribution tubes 122, 124, and 126. Since two of the three solution distribution tubes 122, 124, and 126 are attached to the plant growing container 22 while only one is attached to the overflow tank 20, approximately twice the volume of aqueous solution is displaced to the plant growing container 22 as is displaced to the overflow tank 20. As the aqueous solution is displaced from the pumping tank 14, the plant growing container 22 and overflow tank 20 begin to fill.

In operation, the plant growing container 22 is filled with a suitable growing medium such as gravel or nonporous clay pebbles. This material occupies the plant growing container 22 and thus increases the rate in which it is filled with the aqueous solution.

The solution level in pumping tank 14 continues to decrease since the solution distribution tubing 18 extends to the bottom of the pumping tank 14. As the level of solution in the pumping tank 14 continues to decrease, the solution level in the plant growing container 22 rises to the top. In the embodiment of the device depicted in FIGS. 1 and 2, as the solution reaches the top of the plant growing container 22, the solution overflows through the side drain 28 into the overflow tank 20. In the embodiment of the device shown in FIGS. 3, 4, 7, 8, and 9, when the solution reaches the top of the plant growing container 22, the solution overflows through an overflow tube 30 mounted internally in the plant growing container 22.

At this point in the solution application cycle the overflow tank 20 fills quickly. The volume of solution leaving the pumping tank 14 is equal to the volume of solution entering the overflow tank 20 due to the overflow from the plant growing container 22.

The system continues in this mode of operation until substantially all of the solution is displaced from the pumping tank 14. The volume of the overflow tank 20 is sufficient in all of the embodiments of the device to hold the amount of solution displaced through the distribution tubing 18 and accumulated through overflow.

Once it has displaced substantially all of the solution from the pumping tank 14, the applied pneumatic pressure then forces air through the system into the growing medium and aqueous solution of the plant growing container 22 as well as into the overflow tank 20. This oxygenates the roots of the plant in the growing medium, the growing medium itself, and the solution.

Referring to FIGS. 1, 2, 3, 4, 5, and 6, after a sufficient period of oxygenation, the pump 10 is turned off, either manually, or by some form of automatic control means such as the timed switch 11. When the pneumatic pump 10 is turned off, gravity drains the solution from the plant growing tray 22 and overflow tank 20 back into the pumping tank 14 through the solution distribution tubing 18. The air in the pumping tank 14 is displaced from the system through the three way passive pneumatic valve 16. This displacement continues until substantially all of the solution has drained back from the plant growing container 22 and the overflow tank 20 into the pumping tank 14.

Figure 5:
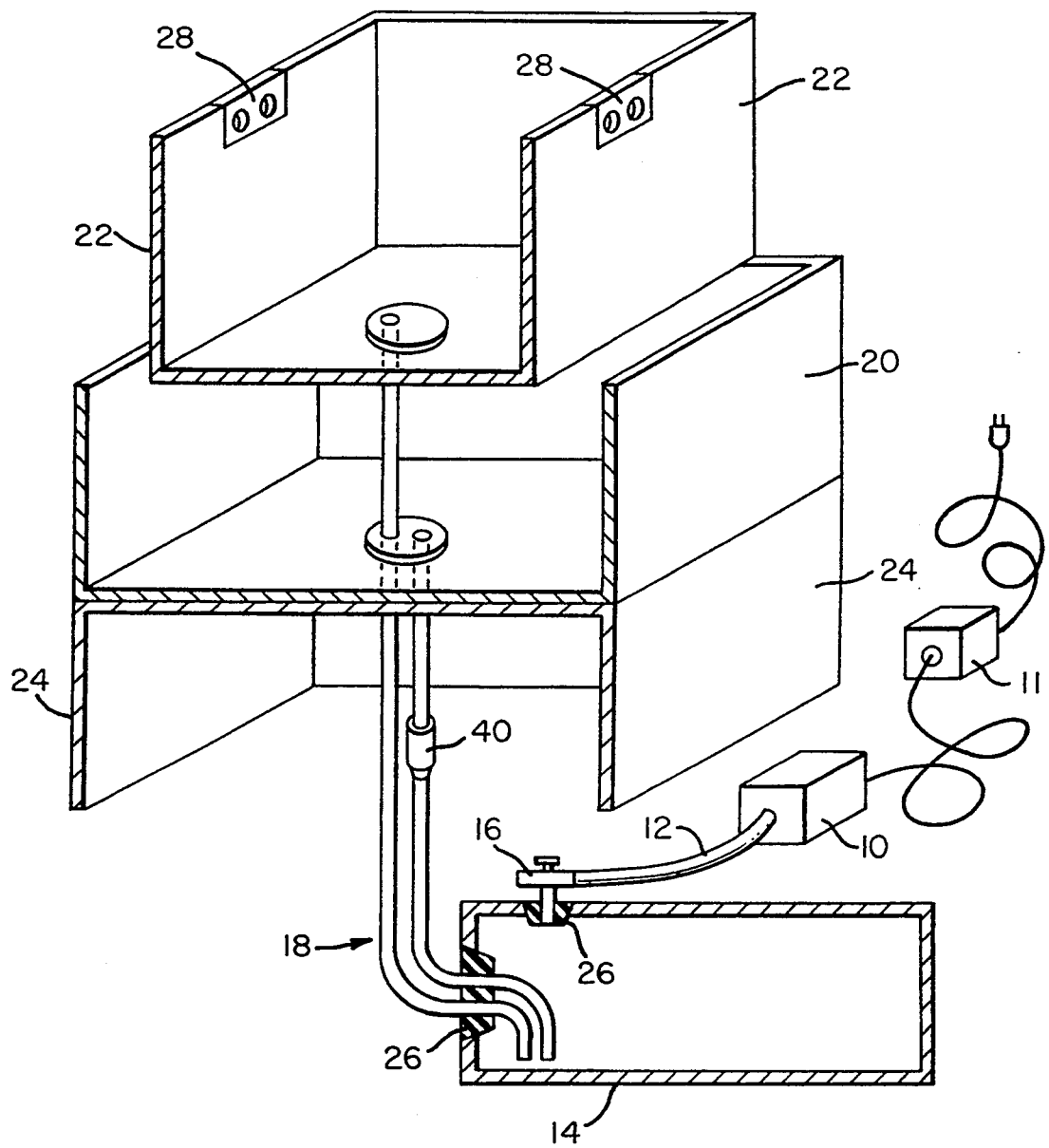
FIG. 5 is a front view of a third embodiment of a hydroponic gardening system according to the present invention.

In the arrangements just described, it will be noted that nutrient solution is pumped not only into the plant container 22 but also into the overflow tank 20, and that the number of tubes and the volume of the pumping tank 14 are chosen so that solution fills the plant growing container 22. This arrangement eliminates the need for a check valve in the tubing line between the overflow tank 20 and the pumping tank 14, and so eliminates a moving part in the system so that in general the only moving part in the system is the air pump 10. However, a one-way or check valve 40 as shown in the embodiment of FIG. 5 could be used to prevent flow in the direction from the pumping tank 14 to the overflow tank 20 while permitting drainage from the overflow tank 20 to the pumping tank 14.

Figure 6:
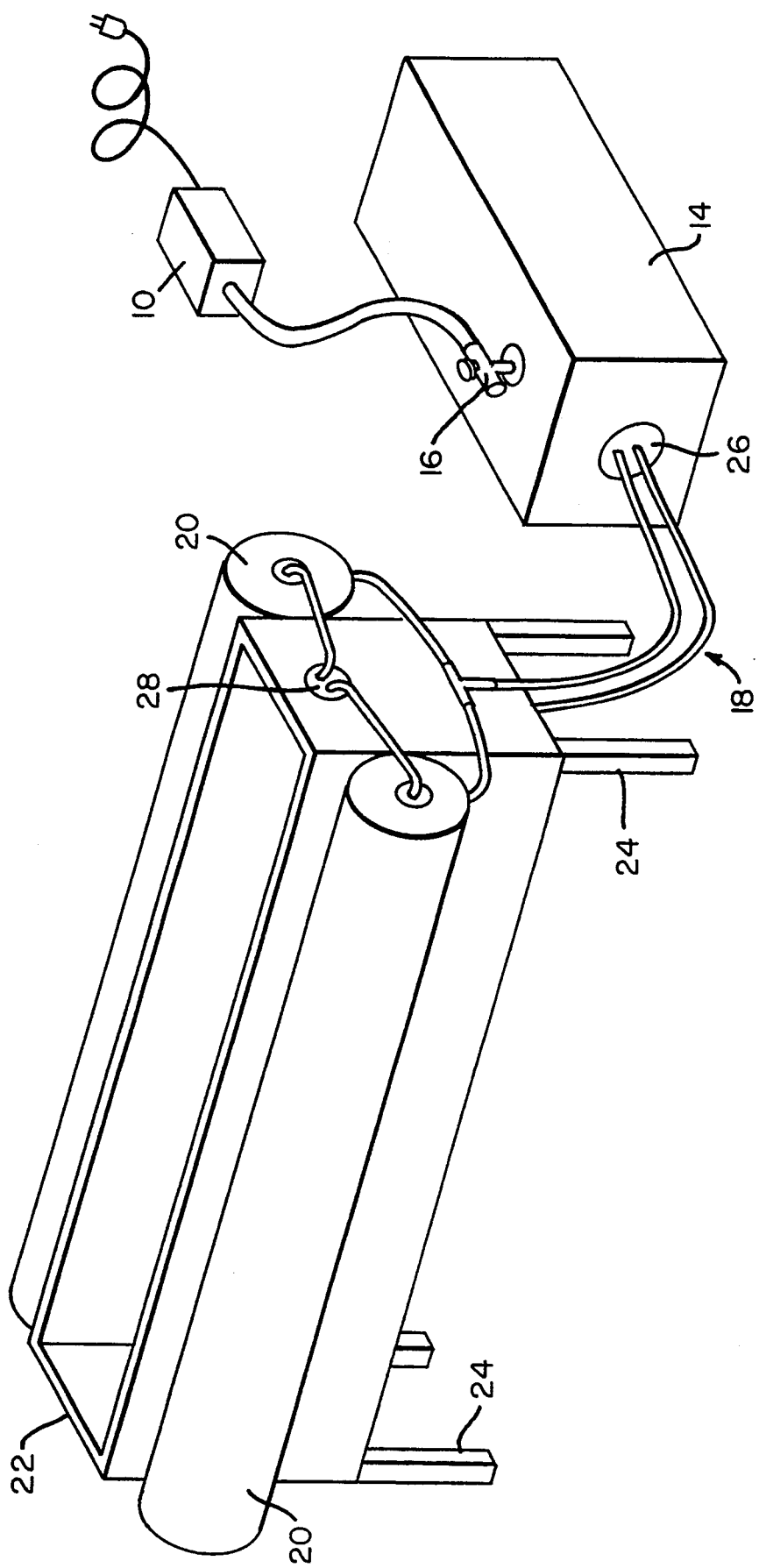
FIG. 6 is a perspective view of a fourth embodiment of the hydroponic gardening system according to the present invention.

The overflow tank can be mounted on the side of the plant growing container as shown in FIG. 6. The embodiment of FIG. 6 as shown does not include a check valve.

As mentioned above, the pump 10 can be simply plugged into line voltage, or connected to a timer which would turn the pump on for a interval of a preselected duration and then turn it off at preset intervals.

Figure 7:
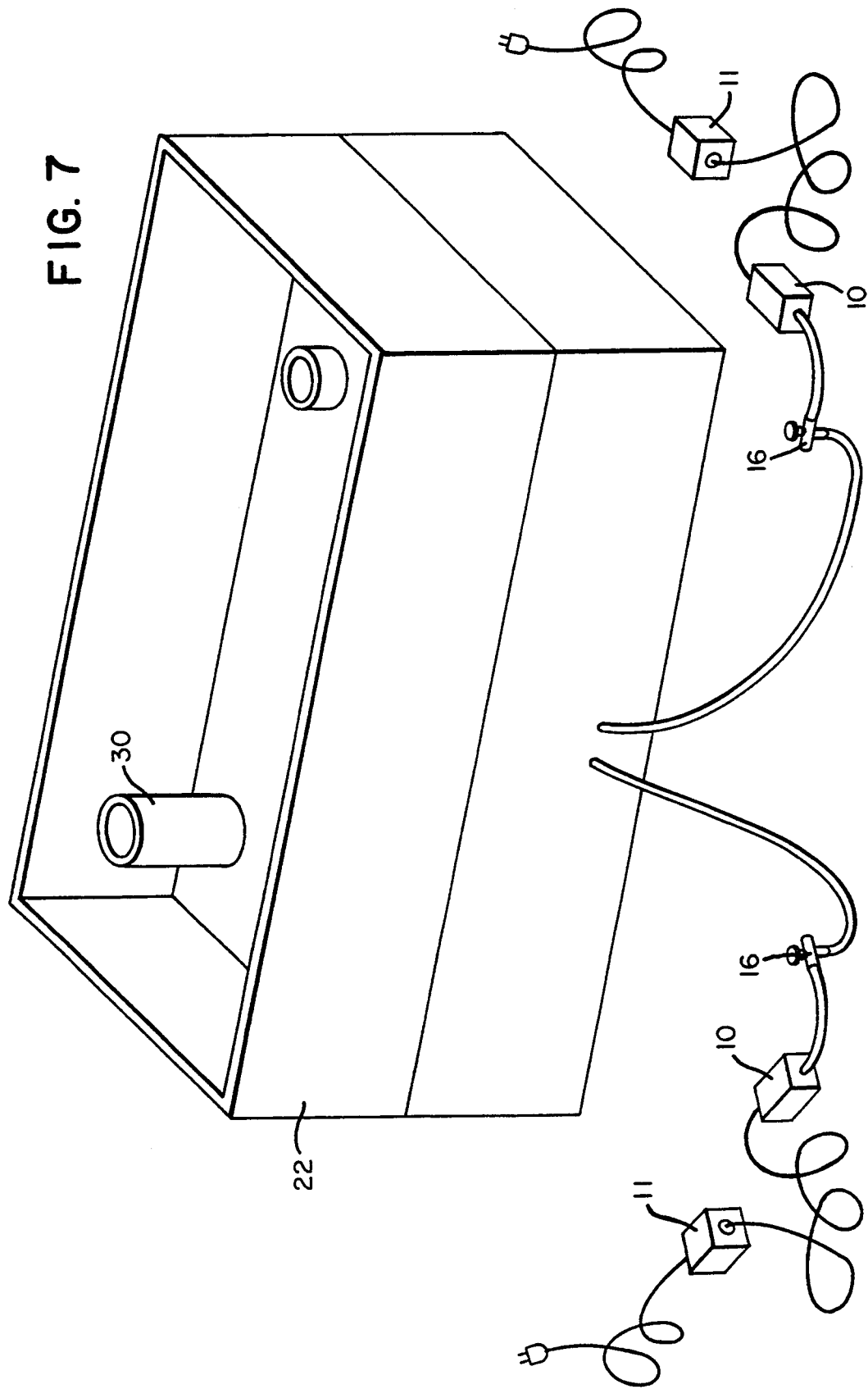
FIG. 7 is a perspective view of a fifth embodiment of the hydroponic gardening system according to the present invention.
Figure 8:
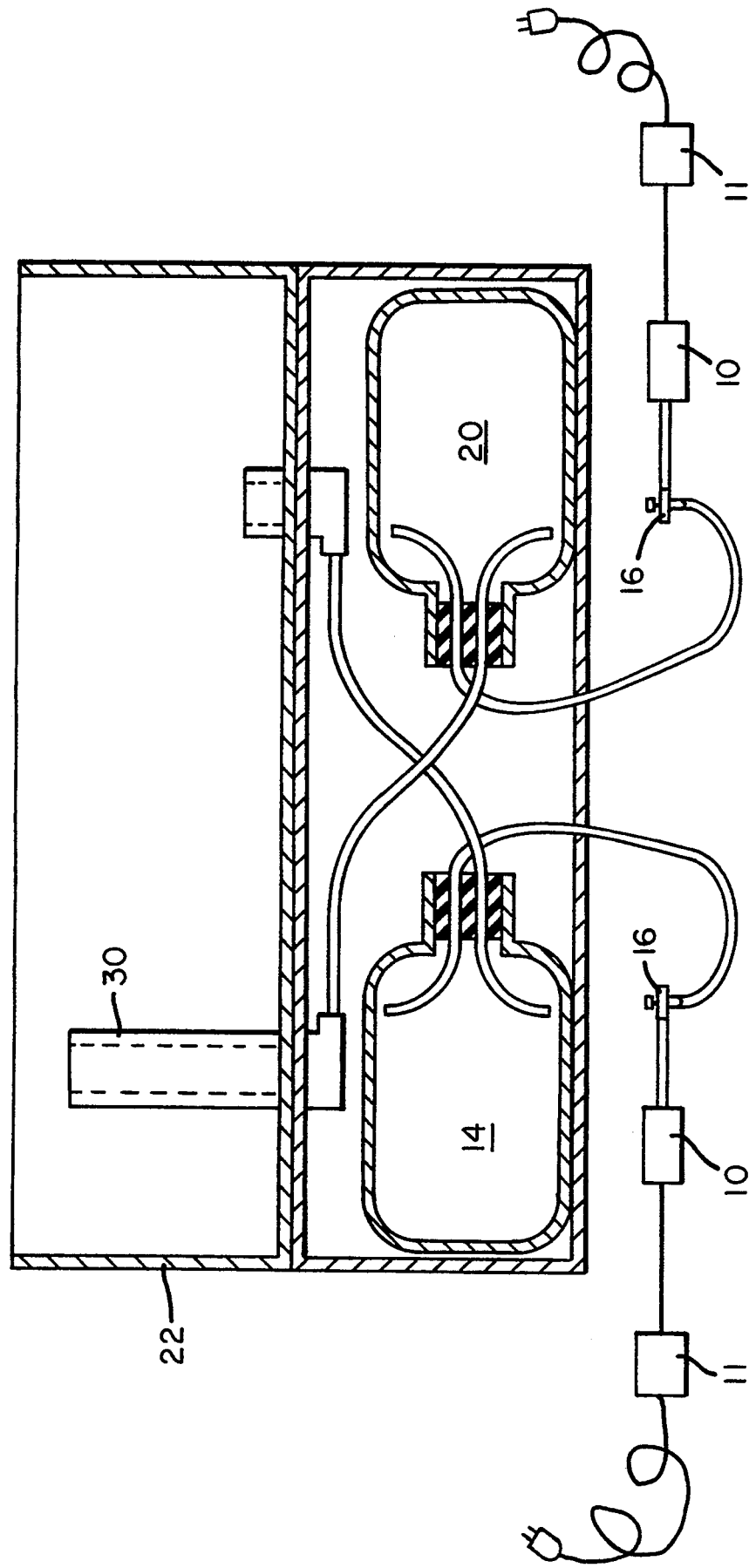
FIG. 8 is a cross sectional view of the embodiment shown in FIG. 7.

Referring to FIGS. 7 and 8, solution is displaced from the pumping tank through the distribution tube into the plant container once the pump attached to the pumping tank is turned on. As in the other embodiments of the invention, solution begins to fill the plant container 22. The three way passive valve is set to allow sufficient pressure to enter the pumping tank 14 to displace the solution. Once the solution reaches the top of the plant growing container, the solution overflows through an overflow tube 30 mounted internally in the plant growing container 22. This overflow solution then begins to fill the overflow tank. At this point, the rate of solution flow into the overflow tank is equal to the rate of solution being displaced from the pumping tank.

The system continues in this mode of operation until substantially all of the solution is displaced from the pumping tank 14. The volume of the overflow tank is sufficient to hold all the overflow solution. The solution entering the overflow tank 20 displaces the air in the tank through the three way pneumatic valve 16 attached to the overflow tank. Once the applied pneumatic pressure has displaced substantially all of the solution from the pumping tank 14, the applied pneumatic pressure then forces air through the system into the growing medium and aqueous solution of the plant growing container 22.

Referring to FIG. 7 and 8, after a sufficient period of oxygenation, the pump 10 attached to the pumping tank is turned off either manually or by some form of automatic control means such as timed switch 11. When the pneumatic pump 10, attached to the pumping tank, is turned off solution flows back from the growing container through the solution distribution tubing into the pumping tank. The air in the pumping tank is displaced through the three way pneumatic valve 16 by the solution entering the tank. The pump 11 attached to the overflow tank 20 is then turned on displacing the solution in the overflow tank back into the plant growing container 22 which further drains through gravity into the pumping tank 14. The system remains in this mode of operation until substantially all of the fluid has been displaced from the overflow tank 20, at which point in time the system is turned off either manually or by the timed switch attached to the pump.

Figure 10:
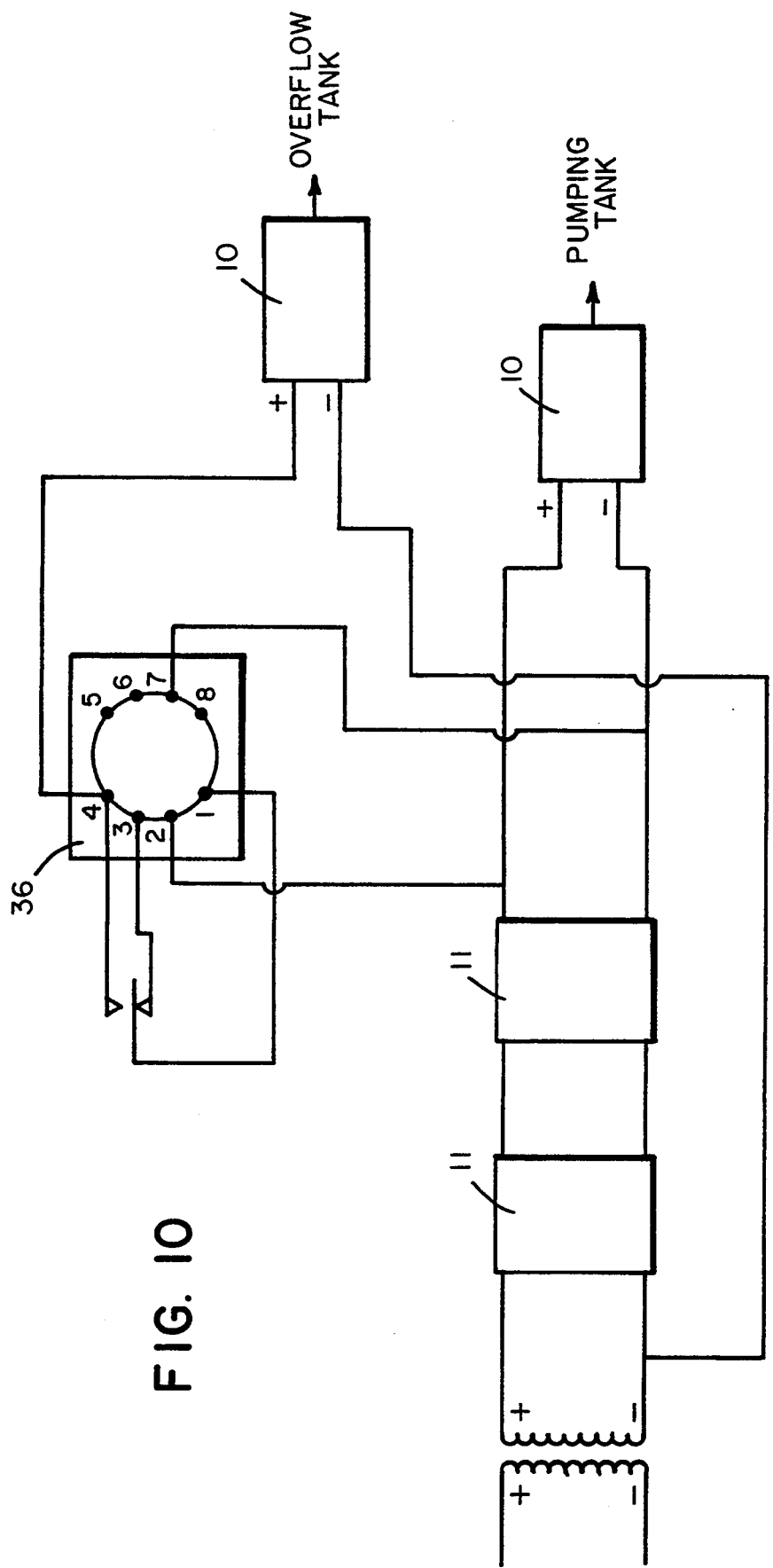
FIG. 10 is a diagrammatic view of a timer/pump wiring arrangement useful with the embodiments shown in FIGS. 7 and 8.

FIG. 10 shows an alternative arrangement of the pumps and timers attached to a relay which would prevent both pumps from being turned on at the same time displacing all of the solution in the system into the growing container 22 at the same time. This configuration uses a double pole double throw relay 36. Also shown in FIG. 10, it may be advantageous to place screens around the tube ends in the growing container to prevent particulate matter from clogging the tube.

Figure 9:
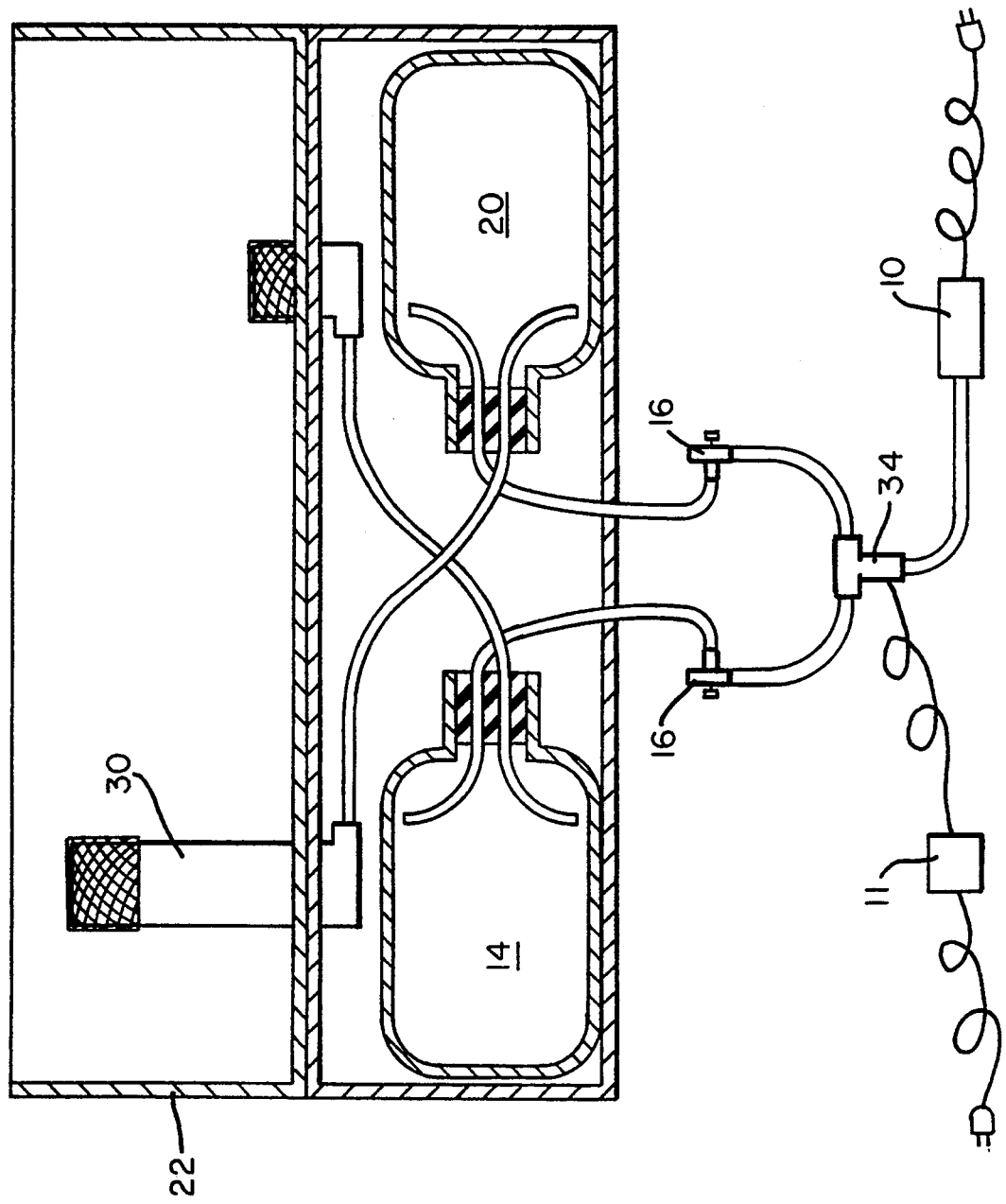
FIG. 9 is a perspective view of a sixth embodiment of the hydroponic gardening system according to the present invention.

FIG. 9 shows a configuration using only one pump 11 and a three way solenoid actuated pilot valve 34. This solenoid actuated pilot valve when actuated will direct the pneumatic pressure from the pump to either the pumping tank 14 or the overflow tank 20. When the pneumatic pressure is directed toward the pumping tank 14 pressure displaces the solution out of the tank into the growing tank. The fluid level quickly rises reaching the top of the overflow tube. Once the top of the tube is reached, the overflow solution flows into the overflow tank. At this point, the same volume of fluid leaving the pumping tank is displaced into the overflow tank. Once substantially all of the solution is displaced from the pumping tank air is then pumped into the growing tank, growing medium and solution in the growing tank. The system remains in this state until the three way solenoid actuated pilot valve 34 is switched either by manually energizing the device or by a timer activated switch. Once the operating state of the valve has been changed pressure then forces the fluid back from the overflow tank into the growing container. All the fluid then drains from the growing container back into the pumping tank. Once substantially all the fluid has been pumped back out of the overflow tank 20 and drained out of the growing container 22 the system once again remains in a steady state until the solenoid actuated pilot valve has been reenergized either manually or by a timer activated switch.

Figure 11:
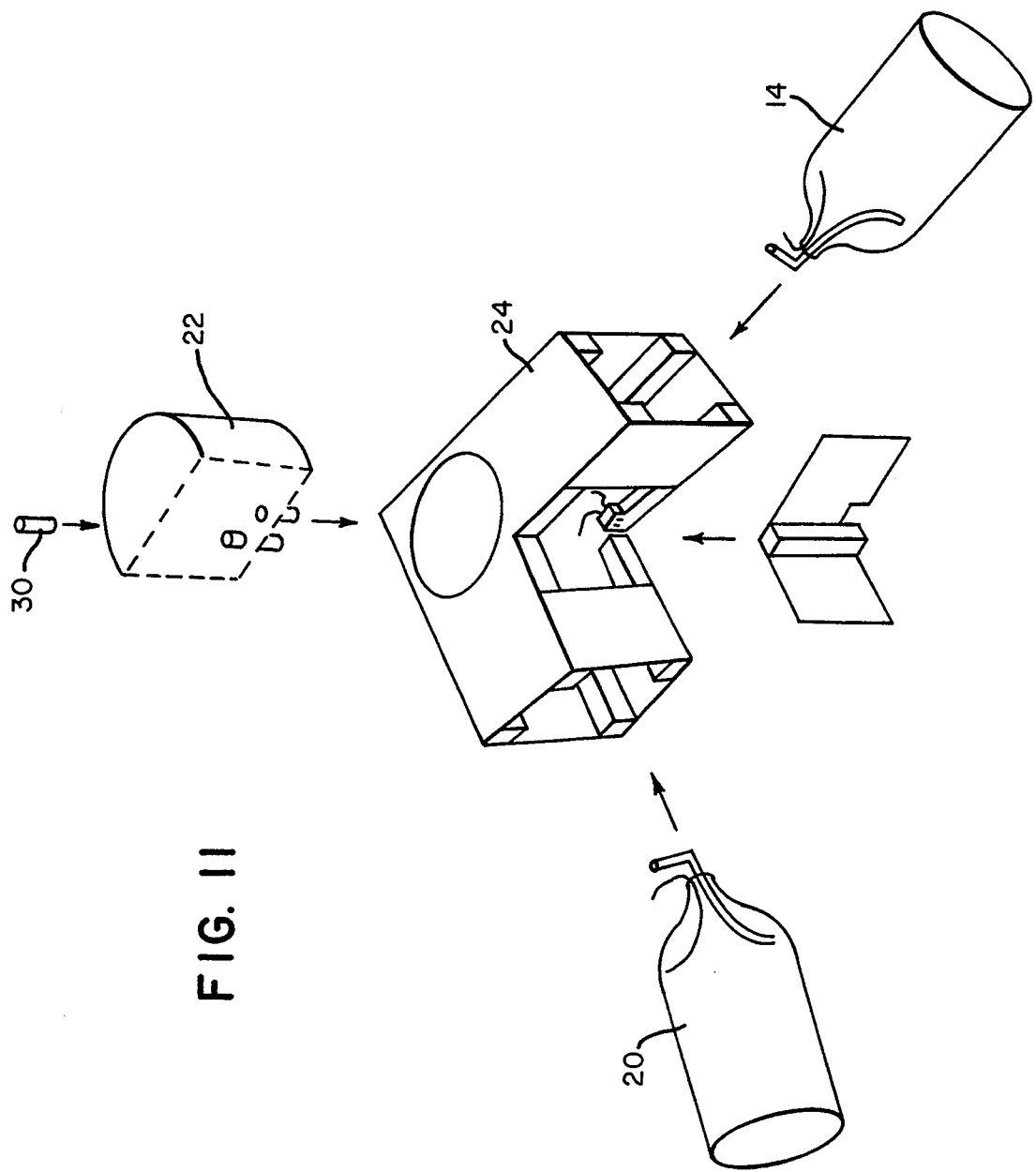
FIG. 11 is a perspective view of a seventh embodiment of the hydroponic gardening system according to the present invention in a disassembled state.
Figure 12:
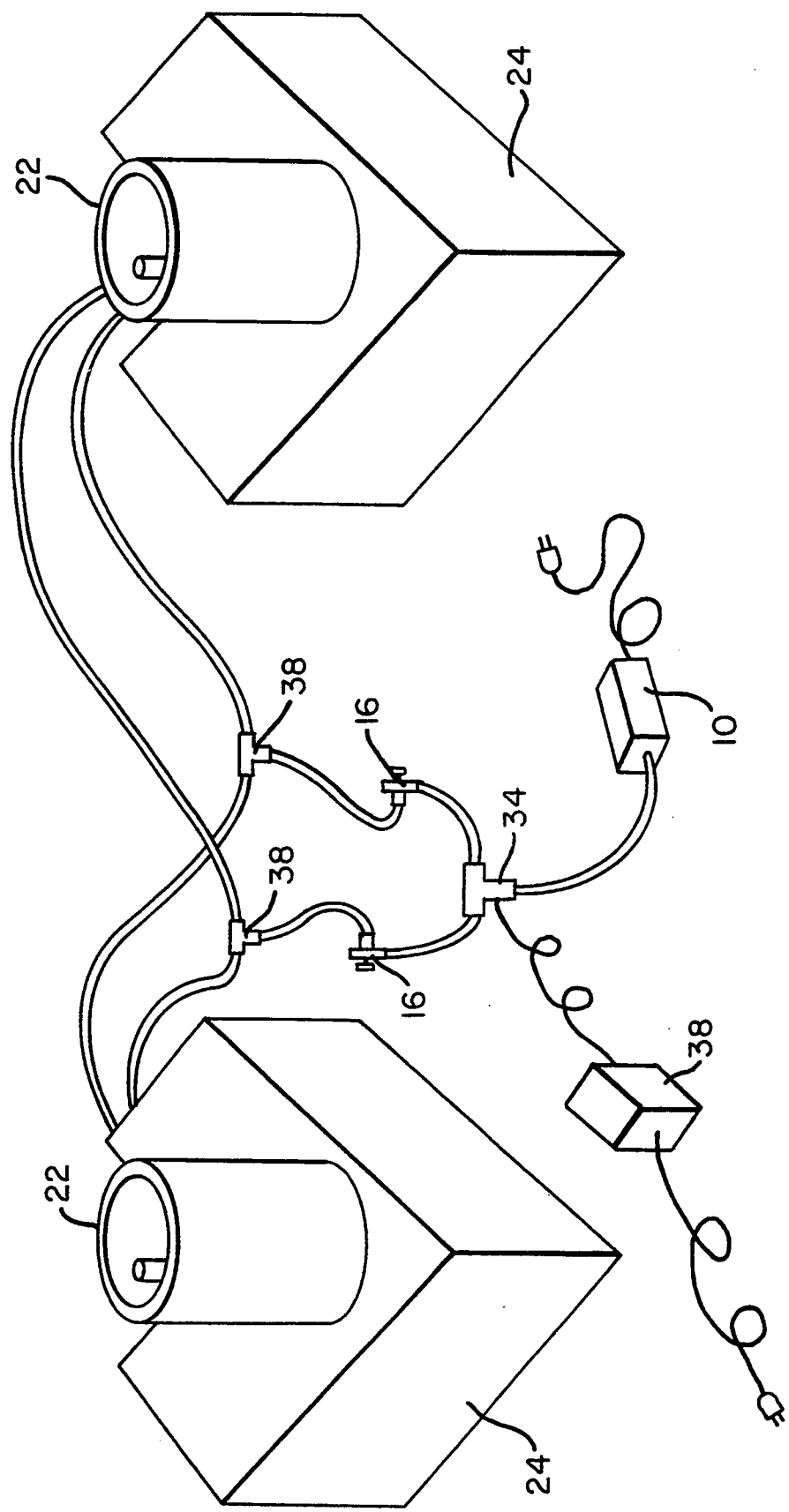
FIG. 12 is a perspective view of two systems shown in FIG. 11 cascaded so that they are driven by only one timer/pump system.

Referring to FIGS. 11 and 12, the hydroponic system can be made so that it is modular and easy to assemble. It is modular both in the sense that its components are easily separated and replaced, and in the sense that each assemblage is a module which can be nested with another module of similar configuration. In the example shown, the module is L-shaped. Another module of similar configuration can be placed with its external vertex adjacent the internal vertex of the first L-shaped module. This arrangement can obviously be repeated as desired. The pneumatic interconnection of these modules is shown schematically in FIG. 12. FIG. 12 shows how multiple units can be cascaded with the use of simple air hose T-connectors 38.

Referring to FIGS. 13(a) through 13(c), the hydroponic system can be made using only one solution distribution tube 40 and a solution distribution T-connector 42. One of the three orifices of the T-connector 42 is connected to the pumping tank 14, another is connected to a line leading to the growing container 22, and the last connects with the overflow tank 20. The diameter of the orifice connected to the overflow tank 20 is restricted using a stopper with a hole or tube through its center. The diameter of the orifice is selected to control during the pumping phase the ratio of fluid going to the growing container 22 with respect to the fluid going to the overflow tank 20. As mentioned above, it is desirable in the present embodiments to maintain this ratio as large as possible between the orifice of the tubes running to the growing container 22 and the overflow tank 20. The orifice of the tube to the overflow tank 20 need only be large enough to allow for proper drainage from the overflow container. In general, this relationship holds true for all embodiments of the invention.

Figure 14:
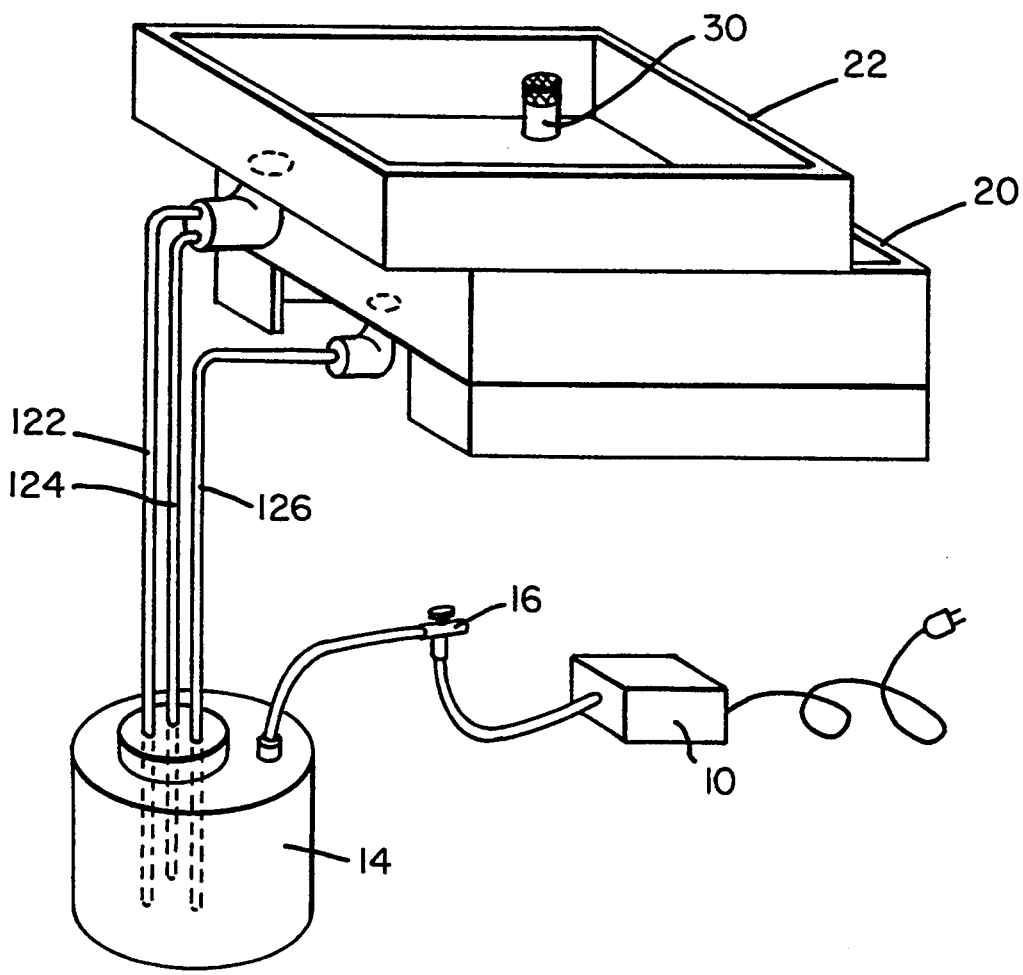
FIG. 14 is a perspective view of a ninth embodiment of the hydroponic gardening system according to the present invention.

Referring now to FIG. 14, a hydroponic growing system according to the present invention can be configured so that the pumping tank 14 is connected to the overflow tank 20 and the growing container 22 by a fluid distribution system consisting of three elongated fluid distribution tubes 122, 124, and 126. In this arrangement, the growing container 22 and overflow tank 20 can be elevated with respect to the pumping tank 14, such as by placing the growing container 22 and overflow tank 20 on a tabletop and the pumping tank 14 on the floor.

As is the case with the other embodiments, the above arrangement can be easily assembled using readily available materials. The pump may be a standard aquarium pump, and the growing container 22 and overflow tank 20 may be food containers such as Rubbermaid brand 17 cup rectangular food containers. The pumping tank 14 may be a HDPE Jerry can.

It has been found in this last arrangement that the characteristics of the pumping/drainage cycle are very sensitive to the relative depth of the three tube ends in the pumping tank 14. In general, it is preferred to have the end of the tube leading to the overflow container 20 be somewhat shallower than the ends of the two tubes leading to the growing container 22 to ensure that the growing container overflows and is properly aerated. Relative tube lengths can be adjusted, however, to tune and tailor the pumping/drainage cycle if so desired.

Again, in either of the above embodiments, it may be advantageous to place screens around the tube ends in the growing container to prevent particulate matter from clogging the tubes.

The invention is described above in terms of preferred embodiments simply for the sake of concrete examples. It will be apparent to one of ordinary skill in the art, however, that other modifications could be made without departing from the scope of the invention. The invention should therefore not be considered as being limited to the foregoing examples, but instead as being fully commensurate in scope with the following claims.

What is claimed is:

1. A hydroponic cultivation apparatus comprising:
    a pumping tank;
    a plant container;
    conduit means;
    first means connecting said pumping tank and said conduit means for conveying fluid from a bottom area of said pumping tank to a bottom area of said plant container;
    an overflow tank arranged with respect to the plant container to catch overflow from the plant container;
    second means connecting said overflow tank and said pumping tank for conveying fluid between said overflow tank and said pumping tank;
    means for pressurizing said pumping tank to force liquid therefrom into said plant container until said plant container overflows and said pumping tank is substantially empty of liquid;
    means for depressurizing said pumping tank to allow fluid in said plant container and said overflow tank to return to said pumping tank;
    wherein said pressurizing means is an air pump and said depressurizing means is a relief valve; and
    wherein the fluid carrying capacity from said pumping tank to said plant container of said first means is significantly greater than the fluid carrying capacity from said pumping tank to said overflow tank of said second means.

2. An apparatus as claimed in claim 1 wherein said first means comprises at least one tube.

3. An apparatus as claimed in claim 2 wherein said second means comprises at least one tube.

4. An apparatus as claimed in claim 1 wherein a fluid carrying capacity from said pumping tank to said plant container of said first means is at least twice a fluid carrying capacity from said pumping tank to said overflow tank of said second means.

5. An apparatus as claimed in claim 1 wherein a capacity of said pumping tank is less than the combined capacity of said plant container and said overflow tank.

* * * * *